(12) United States Patent
Wu et al.

(10) Patent No.: US 12,328,002 B2
(45) Date of Patent: Jun. 10, 2025

(54) ENERGY STORAGE SYSTEM

(71) Applicant: Huawei Digital Power Technologies Co., Ltd., Shenzhen (CN)

(72) Inventors: Zhipeng Wu, Shenzhen (CN); Lin Li, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/343,962

(22) Filed: Jun. 29, 2023

(65) Prior Publication Data

US 2023/0344235 A1   Oct. 26, 2023

Related U.S. Application Data

(63) Continuation of application No. PCT/CN2021/139870, filed on Dec. 21, 2021.

(30) Foreign Application Priority Data

Dec. 30, 2020  (CN) .......................... 202011621197.2

(51) Int. Cl.
*H02J 3/32* (2006.01)
*H02J 7/00* (2006.01)

(52) U.S. Cl.
CPC ............ *H02J 3/32* (2013.01); *H02J 7/00711* (2020.01); *H02J 7/007182* (2020.01); *H02J 2203/10* (2020.01); *H02J 2207/20* (2020.01)

(58) Field of Classification Search
CPC .... H02J 3/32; H02J 7/00711; H02J 7/007182; H02J 2203/10; H02J 2207/20; H02J 3/388; H02J 7/02; H02J 2300/24; H02J 7/0063; H02J 7/34
USPC ......................................................... 307/46
See application file for complete search history.

(56) References Cited

U.S. PATENT DOCUMENTS

2020/0274362 A1*  8/2020  Allert ...................... H02J 3/381

FOREIGN PATENT DOCUMENTS

CN           103928942 A       7/2014

* cited by examiner

*Primary Examiner* — Richard Tan
(74) *Attorney, Agent, or Firm* — Maier & Maier, PLLC

(57) ABSTRACT

An energy storage system is provided, where the energy storage system may include an energy storage module and a power conversion module. The energy storage module may be configured to generate a target waveform signal on the direct current bus when receiving a black start signal. In this case, the power conversion module may be configured to: detect the target waveform signal on the direct current bus, and turn on based on the target waveform signal. When the power conversion module cannot receive a power-on instruction of an energy management system, the power conversion module may also actively turn on when detecting the target waveform signal on the direct current bus, to implement a black startup. This features low costs and higher applicability.

20 Claims, 8 Drawing Sheets

ENERGY STORAGE SYSTEM

CROSS-REFERENCE TO RELATED APPLICATIONS

This application is a continuation of International Application No. PCT/CN2021/139870, filed on Dec. 21, 2021, which claims priority to Chinese Patent Application No. 202011621197.2, filed on Dec. 30, 2020. The disclosures of the aforementioned applications are hereby incorporated by reference in their entireties.

TECHNICAL FIELD

The embodiments relate to the field of battery energy storage technologies and to an energy storage system.

BACKGROUND

In an energy storage system, a plurality of battery modules may be connected in series to obtain a plurality of battery racks, and the plurality of battery racks are connected in parallel to supply power to a load.

Currently, the plurality of battery racks connected in parallel may be enabled by pressing a black start button, to supply power to an auxiliary power supply, so as to start the energy storage system. A large-scale energy storage system may be provided with an uninterruptible power supply (UPS) to supply power to a system controller, so as to start the energy storage system. This results in high costs. In addition, when a network of the energy storage system has not been established or there is no power supply for the system controller, the system controller and another controller in the energy storage system are far away from each other and cannot perform communication. Consequently, a grid-connected power conversion system (PCS, for example, a direct current (DC)/alternating current (AC) inverter) cannot learn a power-on signal, a black startup fails, and the energy storage system cannot be started to supply power to the load.

SUMMARY

The embodiments provide an energy storage system. A power conversion unit may turn on when detecting a target waveform signal on a direct current bus, to implement a black startup. This features low costs and higher applicability.

According to a first aspect, the embodiments provide an energy storage system. The energy storage system may include an energy storage module and a power conversion module. The energy storage module is connected to the power conversion module through a direct current bus, and the energy storage module is in parallel to the power conversion module. The energy storage module may also be referred to as an energy storage container, and the power conversion module may also be referred to as a power conversion system. The energy storage module may be configured to generate a target waveform signal on the direct current bus when receiving a black start signal. A waveform of the target waveform signal may be a preset waveform. The preset waveform may be a waveform set by a user or a waveform configured in a database of the energy storage system. The power conversion module may be configured to: detect the target waveform signal on the direct current bus, and turn on based on the target waveform signal. It may be understood that, when the power conversion module cannot receive a power-on instruction of an energy management system (EMS), the power conversion module may turn on when detecting the target waveform signal on the direct current bus, to implement a black startup. In the embodiments, the power conversion module may actively turn on when detecting the target waveform signal on the direct current bus, to implement a black start of the energy storage system. This features lower costs and higher applicability.

With reference to the first aspect, in a first possible implementation, the energy storage module may include an energy storage unit, a battery control unit, and a direct current DC/DC conversion unit (also referred to as a DC/DC converter), and the energy storage unit is connected in parallel to the DC/DC conversion unit. The energy storage unit may be configured to provide a direct current input voltage for the DC/DC conversion unit. The energy storage unit may include at least one battery rack. The battery control unit may also be referred to as a battery control system (BCU). The battery control unit may be configured to deliver the black start signal to the DC/DC conversion unit when detecting a black start instruction. The DC/DC conversion unit may be configured to: receive the black start signal from the battery control unit, and generate the target waveform signal on the direct current bus. In the energy storage system according to the embodiments, the DC/DC conversion unit may generate the target waveform signal with the preset waveform. Then, the power conversion module actively turns on when detecting the target waveform signal, to implement the black start of the energy storage system. This features lower costs and higher applicability.

With reference to the first possible implementation of the first aspect, in a second possible implementation, the energy storage module may further include a black start unit, and the black start unit may be connected to the energy storage unit. The black start unit (for example, a black start button or a black start switch) may be configured to generate the black start instruction. The energy storage unit may be configured to feed back the black start instruction to the battery control unit when detecting the black start instruction. In the energy storage system according to the embodiments, the energy storage unit may feed back the black start instruction to the battery control unit. Then, the black start of the energy storage system is implemented by using the DC/DC conversion unit and the power conversion module. This features lower costs and higher applicability.

With reference to the first or the second possible implementation of the first aspect, in a third possible implementation, the DC/DC conversion unit may be configured to perform open-loop control on a reference voltage of the direct current bus, to generate the target waveform signal on the direct current bus. The reference voltage may be a voltage that is of the direct current bus and that is set by the user or a voltage that is of the direct current bus and that is configured for the energy storage system by default. In the energy storage system according to the embodiments, the DC/DC conversion unit may perform open-loop control to generate the target waveform signal with the preset waveform. Then, the power conversion module actively turns on when detecting the target waveform signal, to implement the black start of the energy storage system. This features lower costs and higher applicability.

With reference to the first or the second possible implementation of the first aspect, in a fourth possible implementation, the DC/DC conversion unit may include a bus voltage loop. The DC/DC conversion unit may be configured to: collect a feedback voltage of the direct current bus, and perform closed-loop control on the feedback voltage and a reference voltage of the direct current bus by using the bus voltage loop, to generate the target waveform signal on the direct current bus. In the energy storage system according to the embodiments, the DC/DC conversion unit may perform closed-loop control to generate the target waveform signal with the preset waveform. Then, the power conversion module actively turns on when detecting the target waveform signal, to implement the black start of the energy storage system. This features lower costs and higher applicability.

With reference to any one of the first to the fourth possible implementations of the first aspect, in a fifth possible implementation, a bus capacitor may be included on the direct current bus, and the bus capacitor is connected in parallel to the DC/DC conversion unit.

With reference to the fifth possible implementation of the first aspect, in a sixth possible implementation, the target waveform signal is a waveform signal of a voltage across the bus capacitor.

With reference to any one of the first to the fourth possible implementations of the first aspect, in a seventh possible implementation, a bus inductor is included on the direct current bus, and the bus inductor is connected in series to the DC/DC conversion unit.

With reference to the seventh possible implementation of the first aspect, in an eighth possible implementation, the target waveform signal is a waveform signal of a current flowing through the bus inductor.

With reference to any one of the first aspect, or the first to the eighth possible implementation of the first aspect, in a ninth possible implementation, the power conversion module may be a direct current DC/alternating current AC conversion unit (also referred to as a DC/AC converter), and an output of the DC/AC conversion unit may be configured to connect to an alternating current grid or an alternating current load. The DC/AC conversion unit is further configured to: when the output is connected to the alternating current grid or the alternating current load, convert direct current electrical energy that is output by the energy storage module into alternating current electrical energy, to supply power to the alternating current grid or the alternating current load. In the energy storage system according to the embodiments, after the DC/AC conversion unit actively turns on, power may be supplied to the alternating current grid or the alternating current load. This features higher applicability.

In the embodiments, in a case in which the power conversion module cannot receive the power-on instruction of the energy management system, the power conversion module may also actively turn on when detecting the target waveform signal on the direct current bus, to implement the black start of the energy storage system. This features lower costs and higher applicability.

DETAILED DESCRIPTION OF EMBODIMENTS

An energy storage system according to the embodiments is applicable to a plurality of types of power generation devices such as a photovoltaic power generation device or a wind power generation device, and different types of power consumption devices (such as a grid, a household device, or industrial and commercial power consumption devices), and may be applied to the automobile field, the micro-grid field, or the like. The energy storage system according is applicable to energy storage of different types of energy storage units. Components in the different types of energy storage units may include a lithium-ion battery, a lead-acid battery (also referred to as a lead-acid storage battery), a supercapacitor (also referred to as an electrochemical capacitor), and the like. A specific type of the component in the energy storage unit is not limited in the embodiments. For ease of description, a battery is used as an example to describe the energy storage system according to the embodiments.

The energy storage system according to the embodiments may include an energy storage module and a power conversion module. The energy storage module is connected in parallel to the power conversion module through a direct current bus. The power conversion module may also be referred to as a power conversion system. The energy storage module may generate a target waveform signal on the direct current bus when receiving a black start signal. A waveform of the target waveform signal may be a preset waveform. The preset waveform may be a waveform stored in the power conversion module, and the preset waveform may be a waveform set by a user. The power conversion module may detect the target waveform signal on the direct current bus, and turn on based on the target waveform signal. It may be understood that, in a case in which the power conversion module cannot receive a power-on instruction of an energy management system, the power conversion module may actively turn on when detecting the target waveform signal on the direct current bus, to implement a black start of the energy storage system. In the energy storage system according to the embodiments, the power conversion module may actively turn on when detecting the target waveform signal on the direct current bus, to implement the black startup. This features low costs and higher applicability. The energy storage system according to the embodiments may be applied to different application scenarios, for example, a scenario of photovoltaic power generation, a scenario of wind power generation, or a scenario of supplying power to a power consumption device. The following uses the scenario of supplying power to a power consumption device as an example for description.

Figure 1:
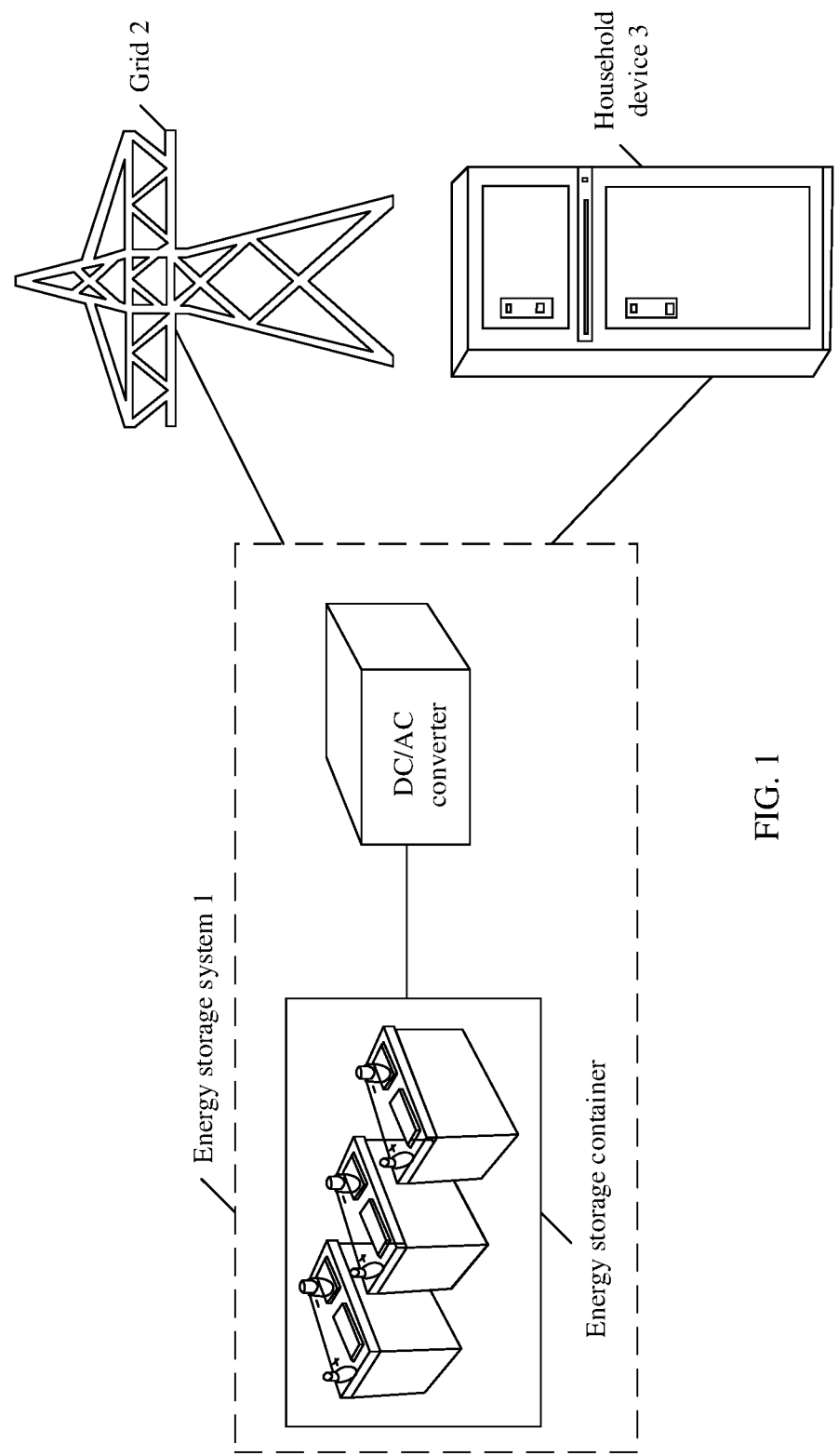
FIG. 1 is a schematic diagram of an application scenario of an energy storage system.

FIG. 1 is a schematic diagram of an application scenario of an energy storage system according to the embodiments. As shown in FIG. 1, the energy storage system (for example, an energy storage system 1) may include an energy storage container and a DC/AC converter. The energy storage container may include a DC/DC converter, and one battery rack or a plurality of battery racks (that is, at least one battery rack), and the plurality of battery racks are connected in parallel. One battery rack may include a plurality of battery groups connected in series. The battery group may be a battery pack. One battery pack may include one or more cells (a voltage of the cell is usually between 2.5 V and 4.2 V) connected in series and in parallel, which form a minimum energy storage and management unit. It may be understood that, the at least one battery rack may provide a direct current input voltage for the DC/DC converter. The DC/DC converter performs power conversion on the direct current input voltage and outputs direct current electrical energy. Then, energy interaction between an energy storage battery and an alternating current grid (for example, a grid 2) or between an energy storage battery and an alternating current load (for example, a household device 3) is implemented by using the DC/AC converter. After the energy storage system 1 is started, the energy storage container may output the direct current electrical energy to the DC/AC converter, and the DC/AC converter may perform power conversion on the direct current electrical energy provided by the energy storage container and may output alternating current electrical energy to the grid 2 or the household device 3, to supply power to the grid 2 and the household device 3.

The following uses FIG. 2 to FIG. 9 as examples to describe an energy storage system according to the embodiments and an operating principle of the energy storage system.

Figure 2:
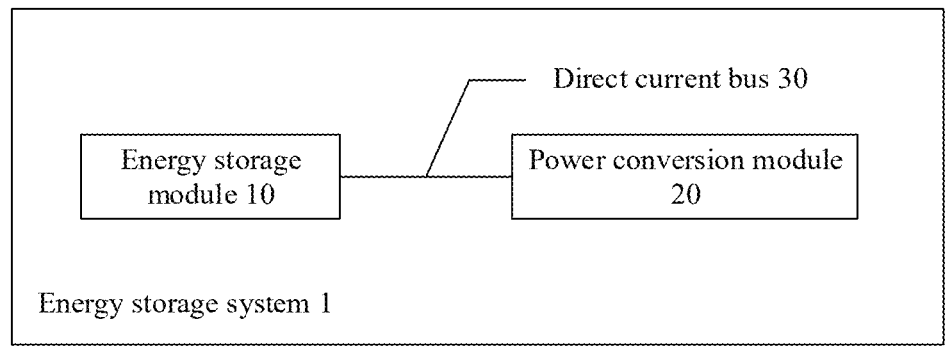
FIG. 2 is a schematic diagram of a structure of an energy storage system.
Figure 3:
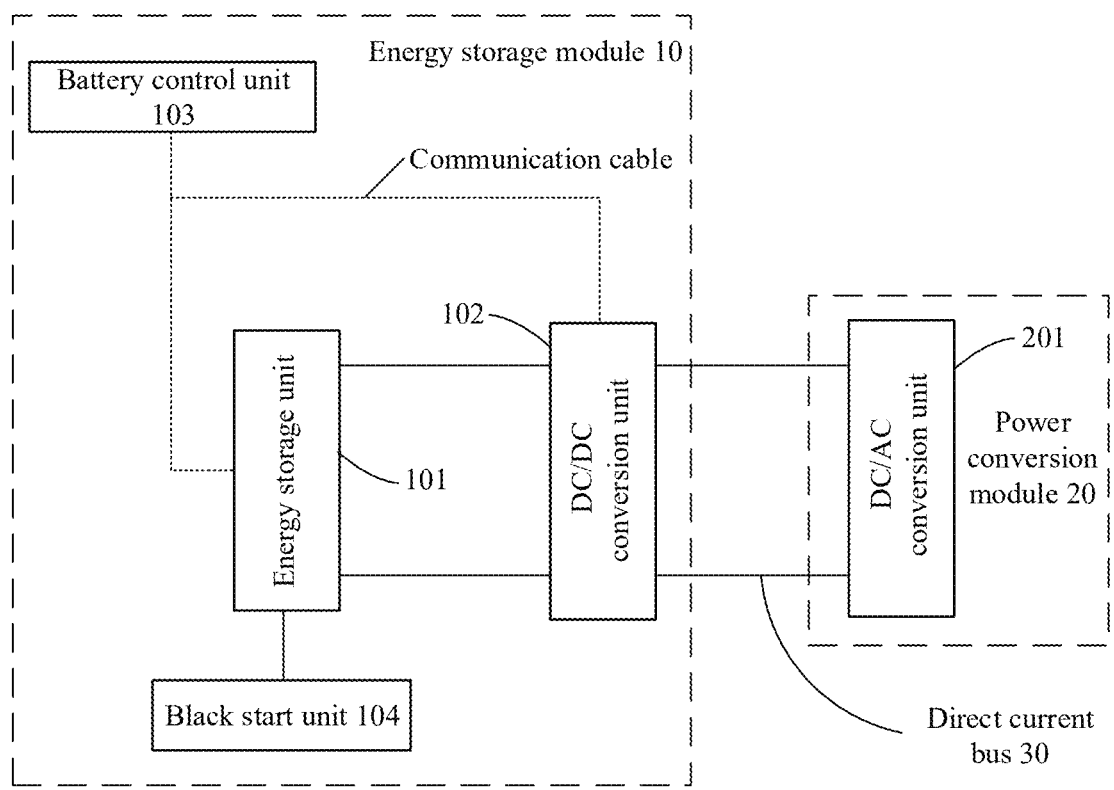
FIG. 3 is a schematic diagram of another structure of an energy storage system.

FIG. 2 is a schematic diagram of a structure of an energy storage system according to the embodiments. As shown in FIG. 2, an energy storage system 1 may include an energy storage module 10 and a power conversion module 20. The energy storage module 10 is connected to the power conversion module 20 through a direct current bus 30. The energy storage module 10 may generate a target waveform signal on the direct current bus 30 when a black start signal is received by the energy storage module 10. A waveform of the target waveform signal may be a preset waveform. The preset waveform may be a waveform set by a user or a waveform configured in a database of the energy storage system. The power conversion module 20 may detect in real time the target waveform signal on the direct current bus, and turn on based on the target waveform signal. It may be understood that, when the power conversion module 20 does not receive a power-on instruction, the power conversion module 20 may actively turn on based on the detected target waveform signal, so as to implement a black start of the energy storage system 1. FIG. 3 is a schematic diagram of another structure of an energy storage system according to the embodiments. As shown in FIG. 3, the energy storage module 10 shown in FIG. 2 may include an energy storage unit 101, a DC/DC conversion unit 102, and a battery control unit 103, and the energy storage unit 101 may be connected in parallel to the DC/DC conversion unit 102. The energy storage unit 101 may include one battery rack or a plurality of battery racks (that is, at least one battery rack), and all of the plurality of battery racks are connected in parallel. One battery rack may include a plurality of battery groups connected in series. The energy storage unit 101 may provide a direct current input voltage for the DC/DC conversion unit 102. The DC/DC conversion unit may be one or more functional modules or hardware devices in the energy storage module 10, and the DC/DC conversion unit may also be referred to as a DC/DC converter. A circuit topology used by the DC/DC conversion unit may be a flying capacitor multilevel circuit (flying capacitor multilevel circuit), a three-level boost circuit (three-level boost circuit), a four-switch buck-boost circuit (four-switch buck-boost circuit), or the like. This may be determined based on a requirement in an actual application scenario, and is not limited herein.

Figure 4:
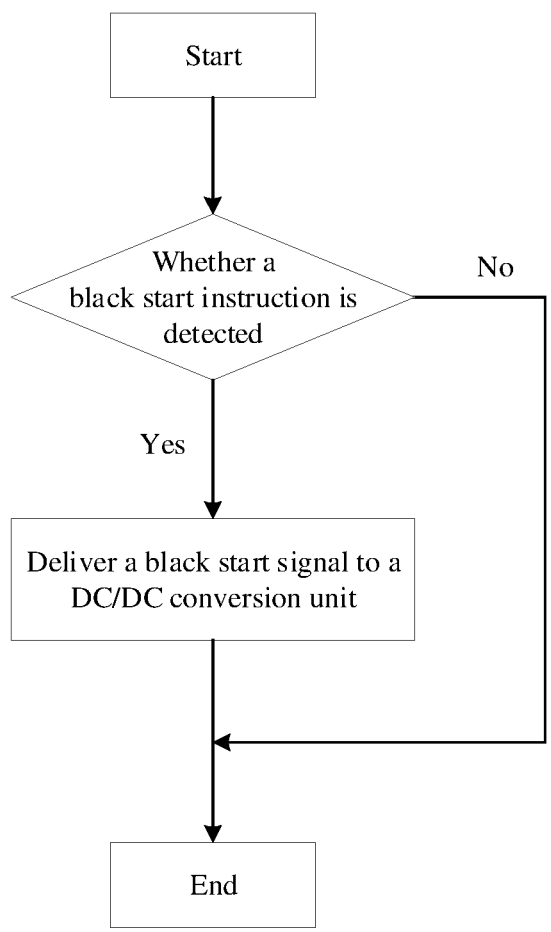
FIG. 4 is a schematic diagram of an operating procedure of a battery control unit.

In some implementations, the energy storage module 10 shown in FIG. 2 may further include a black start unit 104, and the black start unit 104 may be directly or indirectly connected to the battery control unit 103. The battery control unit 103 may communicate with the energy storage unit 101 and the DC/DC conversion unit 102 through a communication cable. It is assumed that the black start unit 104 is a black start button. When the user presses the black start button, the black start button may detect a pressing instruction and generate a black start instruction. It is assumed that the black start unit 104 is a black start switch. When the black start switch is turned on, the black start switch may generate a black start instruction. As shown in FIG. 3, the black start unit 104 may be connected to the energy storage unit 101, to implement a connection to the battery control unit 103. When a black start instruction generated by the black start unit 104 is detected by the energy storage unit 101, the energy storage unit 101 may feed back the black start instruction to the battery control unit 103 through the communication cable. FIG. 4 is a schematic diagram of an operating procedure of a battery control unit according to the embodiments. As shown in FIG. 4, after the battery control unit 103 is started, the battery control unit 103 delivers the black start signal to the DC/DC conversion unit 102 through the communication cable when the black start instruction fed back by the energy storage unit 101 is detected by the battery control unit 103. Alternatively, the black start unit 104 may be directly connected to the battery control unit 103. The battery control unit 103 may deliver the black start signal to the DC/DC conversion unit 102 through the communication cable when detecting the black start instruction generated by the black start unit 104. This may be determined based on an actual application scenario, and is not limited herein. Conversely, the battery control unit 103 ends operation when the battery control unit 103 detects no black start instruction.

Figure 5:
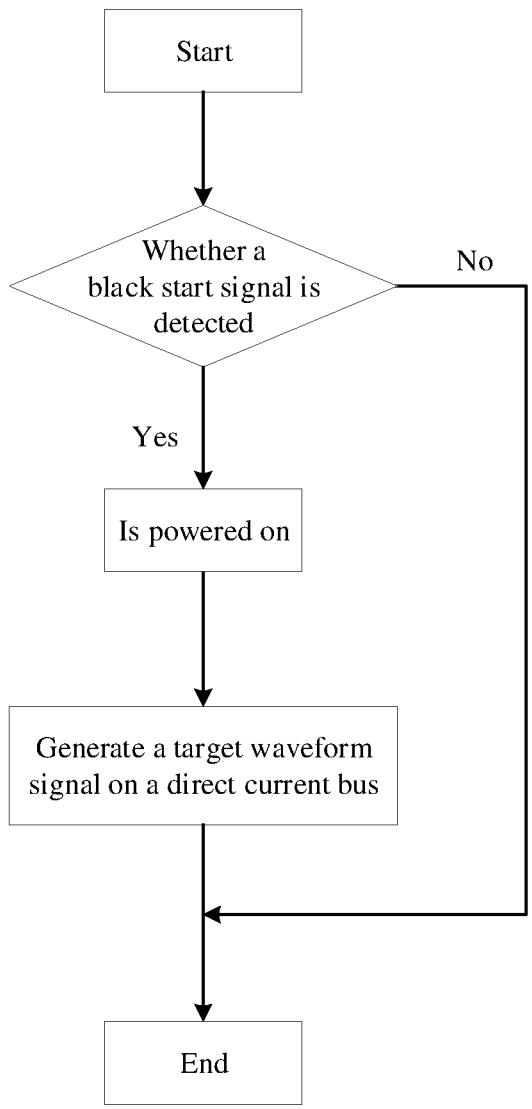
FIG. 5 is a schematic diagram of an operating procedure of a DC/DC conversion unit.

In some implementations, the DC/DC conversion unit 102 may include a plurality of switches. The plurality of switches may be insulated gate bipolar transistors (IGBTs), metal-oxide-semiconductor field-effect transistors (MOSFETs), or diodes, where the IGBTs, the MOSFETs, and the diodes are made of a semiconductor material, such as silicon (Si), made of a third-generation wide-bandgap semiconductor material, such as silicon carbide (SiC), gallium nitride (GaN), diamond, or zinc oxide (ZnO), or made of another material. This may be determined based on an actual application scenario, and is not limited herein. FIG. 5 is a schematic diagram of an operating procedure of a DC/DC conversion unit according to the embodiments. As shown in FIG. 5, after the DC/DC conversion unit 102 is started, the DC/DC conversion unit 102 may detect in real time the black start signal delivered by the battery control unit 103. When the black start signal is detected by the DC/DC conversion unit 102, the DC/DC conversion unit 102 may be powered on and run and control each of the foregoing switches to be turned on or off, so as to generate the target waveform signal on the direct current bus 30. Conversely, the DC/DC conversion unit 102 ends operation when the black start signal delivered by the battery control unit 103 is not detected.

In some implementations, the DC/DC conversion unit 102 may perform open-loop control on a reference voltage of the direct current bus 30, to control each of the foregoing switches to be turned on or off, so as to generate the target waveform signal on the direct current bus 30. The reference voltage may be a voltage that is of the direct current bus and that is set by the user or a voltage that is of the direct current bus and that is configured for the energy storage system by default. The open-loop control is a system control mode without feedback information. After the DC/DC conversion unit 102 is turned on and enters a running state, the DC/DC conversion unit 102 may generate the target waveform signal on the direct current bus 30 based on the reference voltage of the direct current bus 30. The target waveform signal on the direct current bus 30 is consistent with or the same as a waveform signal of an output voltage or an output current of the DC/DC conversion unit 102.

In some implementations, the DC/DC conversion unit 102 may include a bus voltage loop. The DC/DC conversion unit 102 may collect in real time a feedback voltage of the direct current bus 30, and perform closed-loop control on the feedback voltage and a reference voltage of the direct current bus 30 by using the bus voltage loop, to control each of the foregoing switches to be turned on or off, so as to generate the target waveform signal on the direct current bus 30. The bus voltage loop may be configured to adjust an output voltage of the DC/DC conversion unit 102. In the embodiments, an actual output voltage of the direct current bus 30 collected by the DC/DC conversion unit 102 may be referred to as a feedback voltage. The closed-loop control (which may also be referred to as negative feedback control) is a system control mode with feedback information (for example, the feedback voltage). The closed-loop control is a control mode in which a control signal is extracted from variation of an output quantity (for example, the output voltage of the DC/DC conversion unit 102, the foregoing feedback voltage) as a comparative quantity and fed back to an input, to control an input quantity. It may be understood that, when it is detected that there is a deviation between the feedback voltage and the reference voltage (in other words, the feedback voltage is different from the reference voltage, or a difference between the feedback voltage and the reference voltage is greater than a voltage deviation), the DC/DC conversion unit 102 may extract a control signal from the feedback voltage that is collected in real time and control, based on the control signal, each of the foregoing switches to be turned on or off, so as to generate the target waveform signal on the direct current bus 30. The voltage deviation may be a voltage set by the user or a voltage configured for the energy storage system 1 by default. 1 in the control signal may indicate to turn on the switch, and 0 in the control signal may indicate to turn off the switch.

Optionally, in some implementations, a system controller of the energy storage system 1 may generate a switch control signal for controlling each of the switches in the DC/DC conversion unit 102, and control, based on the switch control signal, each of the switches in the DC/DC conversion unit 102 to be turned on or off. The switch control signal may be a pulse width modulation (PWM) signal for each of the switches in the DC/DC conversion unit 102. The pulse width modulation signal may be referred to as a PWM signal for short. For example, 1 in the PWM signal may indicate to turn on the switch, and 0 in the PWM signal may indicate to turn off the switch. In this case, the DC/DC conversion unit 102 may generate, based on turn-on or turn-off of the switches, the target waveform signal on the direct current bus 30.

In some implementations, a bus capacitor or a bus inductor may be included on the direct current bus 30. This may be determined based on an actual application scenario, and is not limited herein. A bus capacitor may be included on the direct current bus 30, and the bus capacitor is connected in parallel to the DC/DC conversion unit 102. In other words, the bus capacitor may be connected in parallel to two ends of an output of the DC/DC conversion unit 102. In the embodiments, all capacitors (for example, one or more capacitors) connected in series to each other on a direct current bus may be referred to as bus capacitors. It can be assumed that one bus capacitor is included on the direct current bus 30, and the bus capacitor may be directly connected in parallel to the DC/DC conversion unit 102. It can be assumed that a plurality of bus capacitors are included on the direct current bus 30, and the plurality of bus capacitors may be connected in series and then be connected in parallel to the two ends of the output of the DC/DC conversion unit 102. In this case, the plurality of bus capacitors connected in series are connected in parallel on the direct current bus 30. In this case, the target waveform signal may be a waveform signal of a voltage across the bus capacitor (for example, the foregoing one or more capacitors) (for example a waveform signal of a voltage on the direct current bus 30).

In some implementations, as an alternative, a bus inductor may be included on the direct current bus 30, and the bus inductor may be connected in series to the DC/DC conversion unit 102. In the embodiments, all inductors (for example, one or more inductors) connected in series to each other on a direct current bus may be referred to as bus inductors. It is assumed that one bus inductor is included on the direct current bus 30, and the bus inductor may be directly connected in series to the DC/DC conversion unit 102. It is assumed that a plurality of bus inductors are included on the direct current bus 30, and the plurality of bus inductors may be connected in series and then be connected in series to the DC/DC conversion unit 102. In this case, the target waveform signal may be a waveform signal of a current flowing through the bus inductor (for example, the foregoing one or more inductors) (for example a waveform signal of a current on the direct current bus 30).

Figure 6:
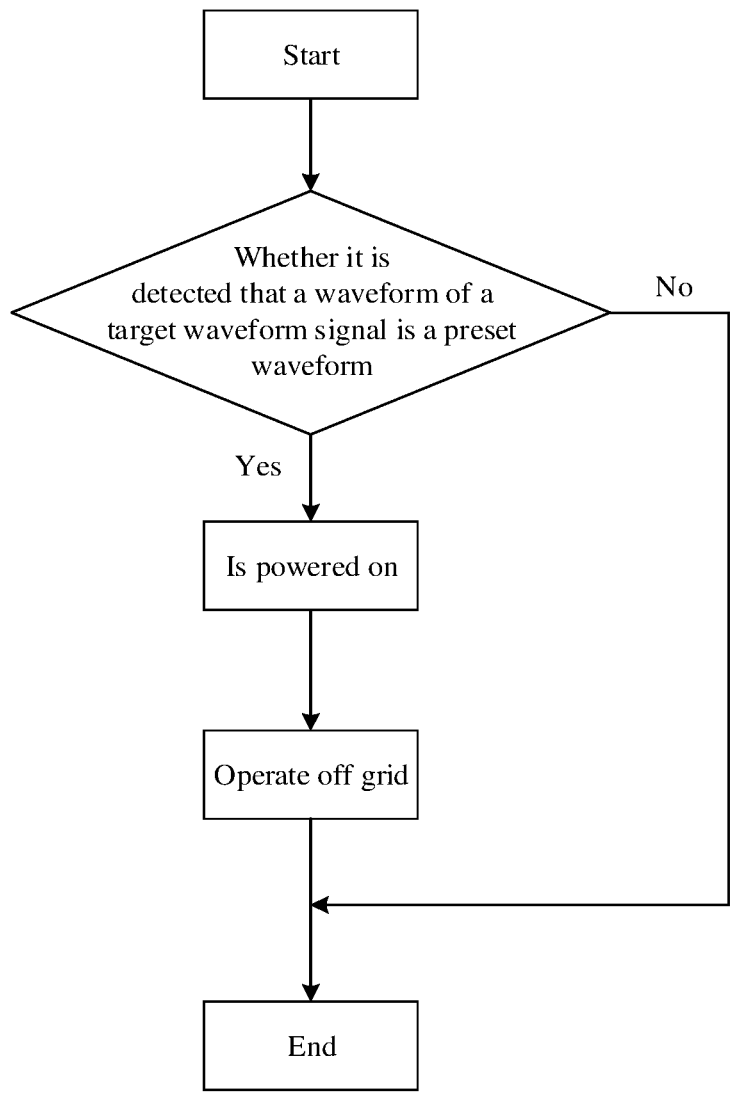
FIG. 6 is a schematic diagram of an operating principle of a DC/AC conversion unit.

In some implementations, as shown in FIG. 3, the power conversion module 20 shown in FIG. 2 may be a DC/AC conversion unit 201. The DC/AC conversion unit 201 may be one or more functional modules or hardware devices in the power conversion module 20. The DC/AC conversion unit 201 may also be referred to as a DC/AC converter. The DC/AC conversion unit 201 may be connected in parallel to the DC/DC conversion unit 102. A circuit topology used by the DC/AC conversion unit 201 may be a neutral point clamped T-type three-level circuit (neutral point clamped T-type three-level circuit), a neutral point clamped circuit (NPC), an active neutral point clamped circuit (ANPC), or a flying capacitor multilevel circuit, or the like. This may be determined based on an actual application scenario, and is not limited herein. FIG. 6 is a schematic diagram of an operating principle of a DC/AC conversion unit according to the embodiments. As shown in FIG. 6, after the DC/AC conversion unit 201 is started, the DC/AC conversion unit 201 may detect in real time the target waveform signal (for example, the waveform signal of the voltage between the two ends of the bus capacitor or the waveform signal of the current flowing through the bus inductor) on the direct current bus 30. When the DC/AC conversion unit 201 detects that the waveform of the target waveform signal is the preset waveform (in other words, the waveform of the target waveform signal is completely the same as the preset waveform), the DC/AC conversion unit 201 may turn on and operate off grid, to implement the black start of the energy storage system 1. The preset waveform is stored in the DC/AC conversion unit 201. Optionally, the DC/AC conversion unit 201 may also actively turn on when the DC/AC conversion unit 201 detects that a degree of matching between the waveform of the target waveform signal and the preset waveform is greater than or equal to a degree-of-matching threshold, so as to implement the black start of the energy storage system 1. This may be determined based on an actual application scenario, and is not limited herein. The degree-of-matching threshold may be a threshold set by the user or a default value configured for the energy storage system 1. Conversely, the DC/AC conversion unit 201 ends operation when the DC/AC conversion unit 201 detects that the waveform of the target waveform signal is not the preset waveform. Optionally, the DC/AC conversion unit 201 ends operation when the DC/AC conversion unit 201 detects that a degree of matching between the waveform of the target waveform signal and the preset waveform is less than the degree-of-matching threshold.

Figure 7:
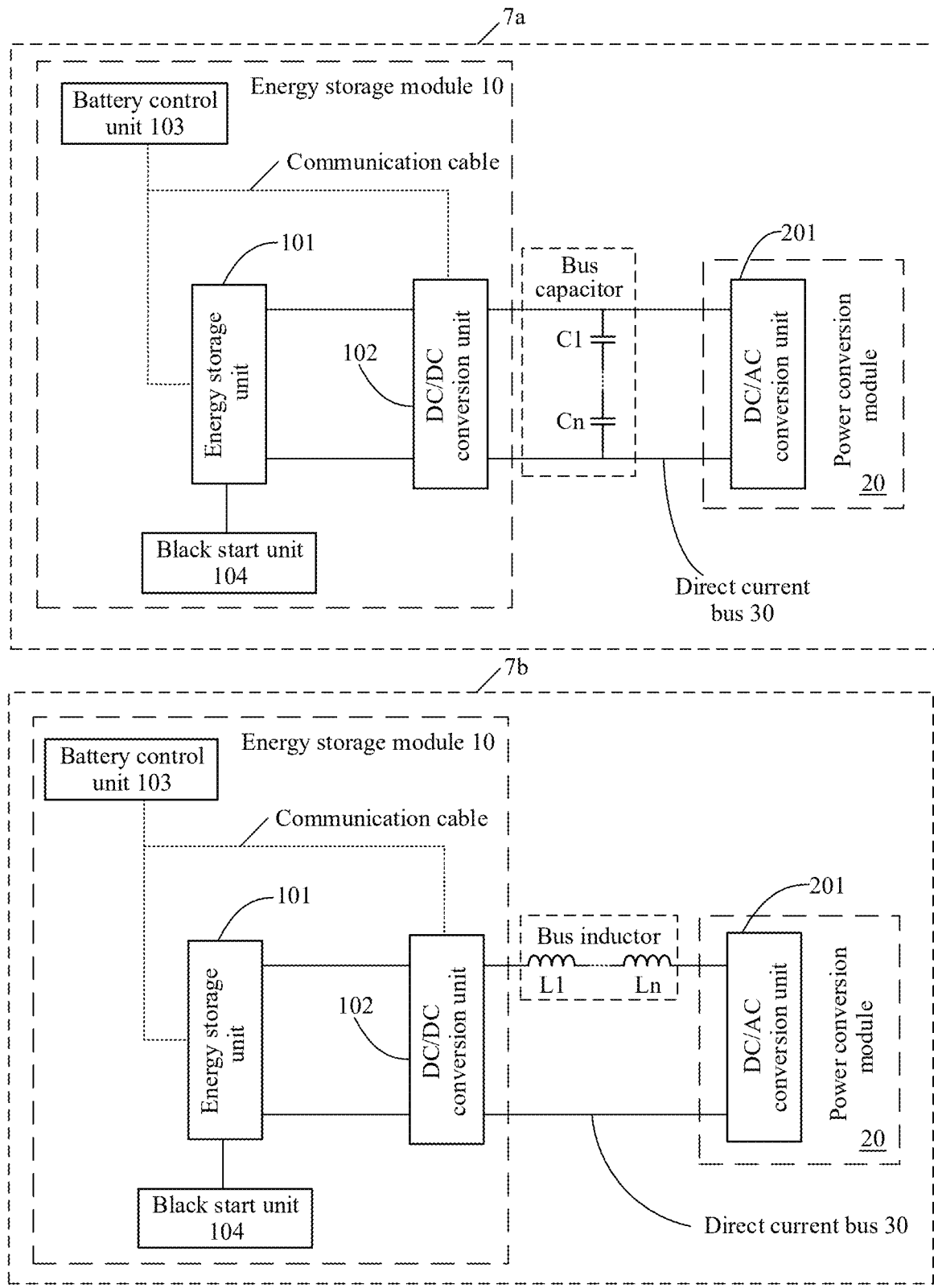
FIG. 7 is a schematic diagram of still other structures of an energy storage system.

FIG. 7 is a schematic diagram of still other structures of an energy storage system according to the embodiments. As shown by 7a in FIG. 7, bus capacitors (for example, capacitors C1 to Cn) may be included on the direct current bus 30. The capacitors C1 to Cn may be connected in series to each other and then connected in parallel to the two ends of the output of the DC/DC conversion unit 102. For ease of description, the following provides description by using an example in which the bus capacitors are the capacitors C1 to Cn, and details are not described below again. The DC/DC conversion unit 102 may perform open-loop control on a reference voltage corresponding to the capacitors C1 to Cn, to control each of the switches in the DC/DC conversion unit 102 to be turned on or off, so as to generate a target waveform signal (for example, a waveform signal of a voltage between two ends of the capacitors C1 to Cn) on the capacitors C1 to Cn. The reference voltage corresponding to the capacitors C1 to Cn may be understood as a total reference voltage of the capacitors C1 to Cn connected in series that are considered as a whole. Alternatively, the DC/DC conversion unit 102 may collect in real time a feedback voltage corresponding to the capacitors C1 to Cn, and perform, by using a bus voltage loop, closed-loop control on the feedback voltage and a reference voltage that are corresponding to the capacitors C1 to Cn, to control each of the foregoing switches to be turned on or off, so as to generate, on the capacitors C1 to Cn, a waveform signal of a voltage between two ends of the capacitors C1 to Cn. The feedback voltage corresponding to the capacitors C1 to Cn may be understood as a total output voltage of the capacitors C1 to Cn connected in series that are considered as a whole. The DC/AC conversion unit 201 may actively turn on when the DC/AC conversion unit 201 detects that a waveform of the waveform signal of the voltage between the two ends of the capacitors C1 to Cn is the preset waveform, so as to implement a black start of the energy storage system 1.

Optionally, in some implementations, as shown by 7b in FIG. 7, bus inductors (for example, inductors L1 to Ln) may be included on the direct current bus 30. The inductors L1 to Ln may be connected in series to each other and then connected in series to the DC/DC conversion unit 102. For ease of description, the following provides description by using an example in which the bus inductors are the inductors L1 to Ln, and details are not described below again. The DC/DC conversion unit 102 may perform open-loop control on a reference voltage corresponding to the inductors L1 to Ln, to control each of the switches in the DC/DC conversion unit 102 to be turned on or off, so as to generate a target waveform signal (for example, a waveform signal of a current flowing through the inductors L1 to Ln) on the inductors L1 to Ln. The reference voltage corresponding to the inductors L1 to Ln may be understood as a total reference voltage of the inductors L1 to Ln connected in series that are considered as a whole. Alternatively, the DC/DC conversion unit 102 may collect in real time a feedback voltage corresponding to the inductors L1 to Ln, and perform, by using a bus voltage loop, closed-loop control on the feedback voltage and a reference voltage that are corresponding to the inductors L1 to Ln, to control the foregoing switches to be turned on or off, so as to generate, on the inductors L1 to Ln, a waveform signal of a current. The feedback voltage corresponding to the inductors L1 to Ln may be understood as a total output voltage of the inductors L1 to Ln connected in series that are considered as a whole. The DC/AC conversion unit 201 may detect in real time the waveform signal of the current flowing through the inductors L1 to Ln and actively turn on when a waveform of the waveform signal of the current is the preset waveform, so as to implement a black start of the energy storage system 1.

In some implementations, a waveform (such as the preset waveform) of the target waveform signal may be a waveform other than a waveform (for example, a straight line) of a waveform signal generated on the direct current bus 30 when the energy storage system 1 is normally started. The energy storage system 1 may further include an energy management system. When the energy storage system 1 is normally started, the energy storage module 10, the power conversion module 20, and the energy management system may work together. The energy management system may deliver a power-on instruction to the DC/AC conversion unit 201 to enable the DC/AC conversion unit 201 to turn on. In this case, a waveform of a waveform signal generated on the direct current bus 30 may be a straight line with a constant voltage or a constant current, or may be a straight line with a fine burr. For example, the waveform of the target waveform signal may be a square wave, a step wave, a sine wave, a sawtooth wave, a rectangular wave, a triangular wave, a trapezoidal wave, or another waveform. This may be determined based on an actual application scenario, and is not limited herein.

Figure 8:
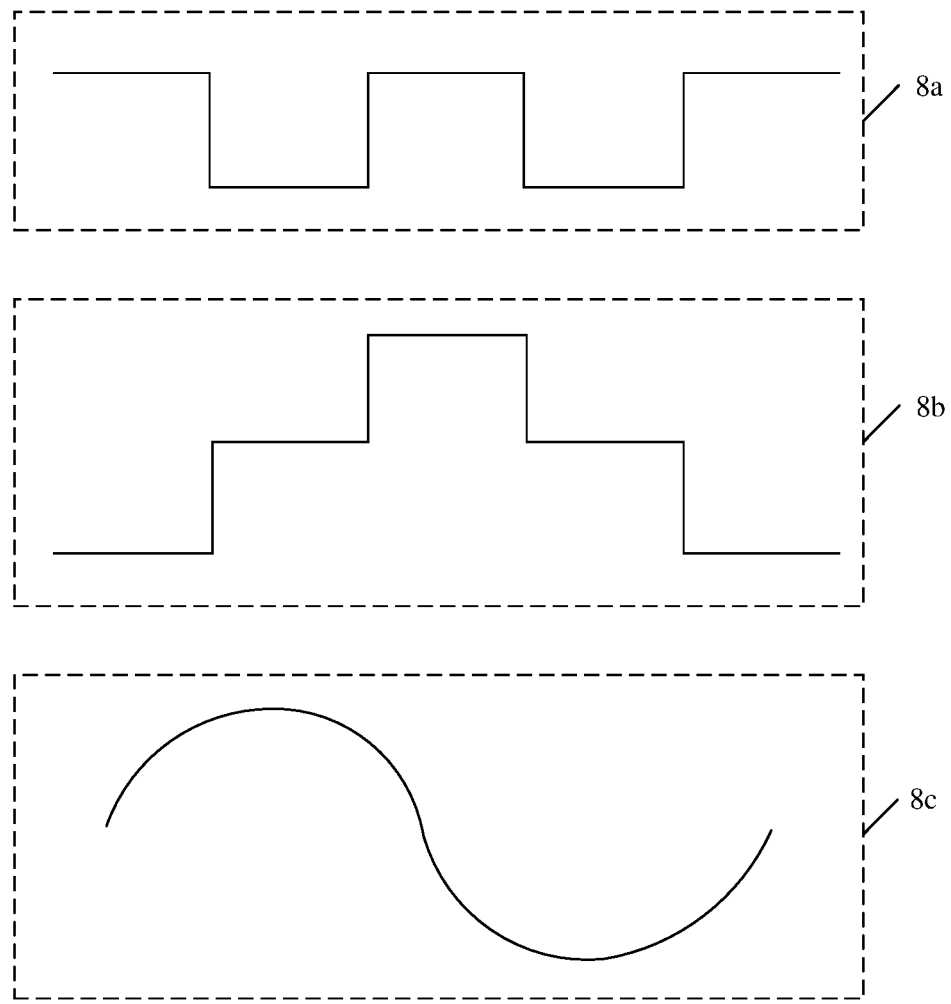
FIG. 8 is a schematic diagram of waveforms of a target waveform signal.

FIG. 8 is a schematic diagram of waveforms of a target waveform signal according to the embodiments. As shown by 8a in FIG. 8, the waveform of the target waveform signal may be a square wave. It can be assumed that the preset waveform stored in the DC/AC conversion unit 201 is the square wave. The DC/AC conversion unit 201 turns on when the DC/AC conversion unit 201 detects that the waveform of the target waveform signal on the direct current bus 30 is the square wave, so as to implement a black start of the energy storage system 1. As shown by 8b in FIG. 8, the waveform of the target waveform signal may be a step wave. It can be assumed that the preset waveform stored in the DC/AC conversion unit 201 is the step wave. The DC/AC conversion unit 201 turns on when the DC/AC conversion unit 201 detects that the waveform of the target waveform signal on the direct current bus 30 is the step wave, so as to implement a black start of the energy storage system 1. As shown by 8c in FIG. 8, the waveform of the target waveform signal may be a sine wave. It can be assumed that the preset waveform stored in the DC/AC conversion unit 201 is the sine wave. The DC/AC conversion unit 201 turns on when the DC/AC conversion unit 201 detects that the waveform of the target waveform signal on the direct current bus 30 is the sine wave, so as to implement a black start of the energy storage system 1. It may be understood that, the black start of the energy storage system 1 means that, after the energy storage system 1 stops running and enters an all-black state because of an external or internal fault, the energy storage system 1 is restarted by starting the black start unit 104 with a black start capability inside the energy storage system 1 without the help of a large grid or another energy storage system. In this way, power supply to a key load and continuous and stable running of the energy storage system 1 can be ensured, a recovery time of the energy storage system 1 can be shortened, and a loss caused by a power failure can be reduced.

Figure 9:
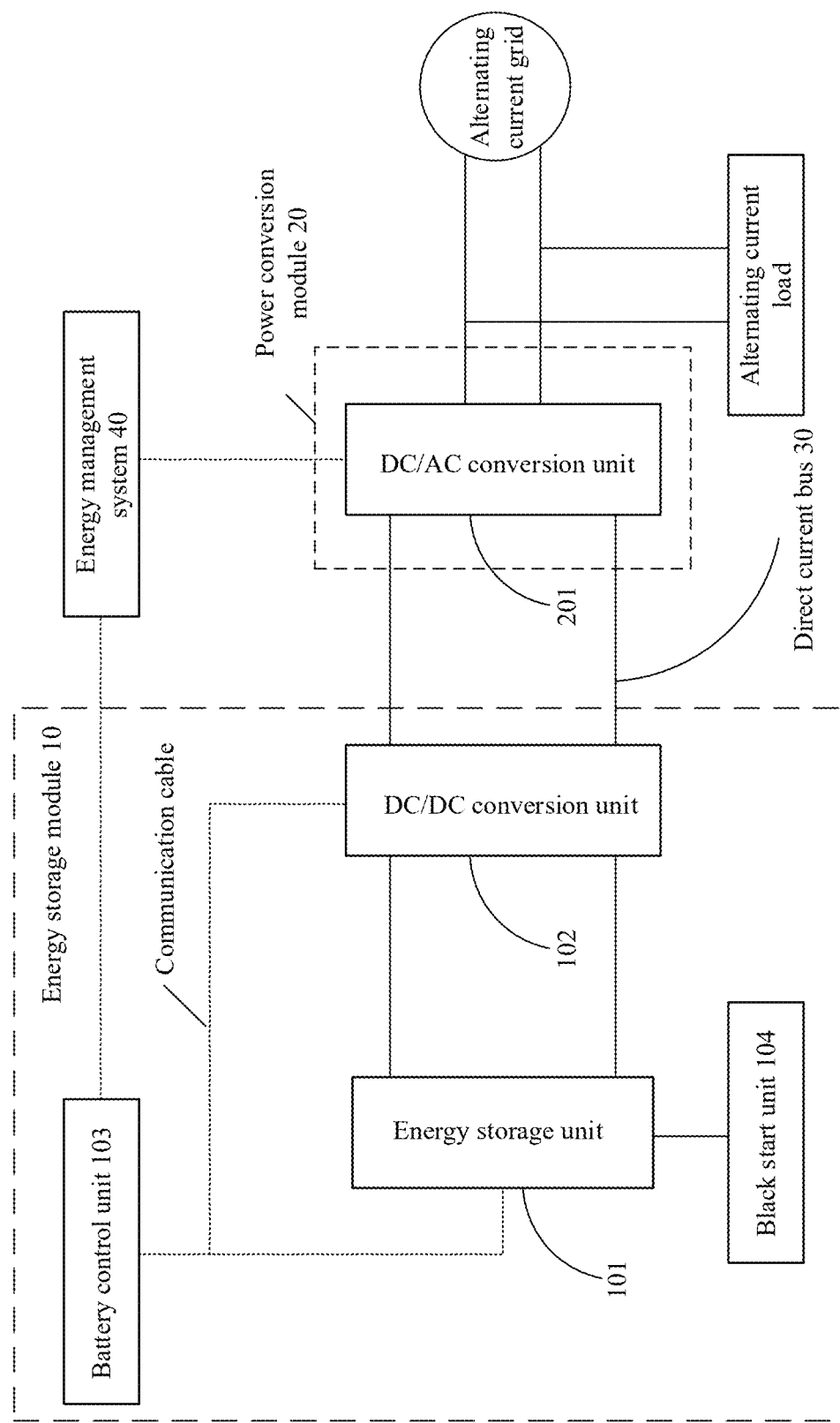
FIG. 9 is a schematic diagram of power supply of an energy storage system.

In some implementations, after the energy storage system 1 is restarted based on the black start, an output of the DC/AC conversion unit 201 may be further connected to an alternating current grid or an alternating current load. When the output is connected to the alternating current grid or the alternating current load, the DC/AC conversion unit 201 may convert direct current electrical energy that is output by the energy storage module 10 into alternating current electrical energy, to supply power to the alternating current grid or the alternating current load. FIG. 9 is a schematic diagram of power supply of an energy storage system according to the embodiments. As shown in FIG. 9, after the energy storage system 1 enters an all-black state, the black start unit 104 that has a black start capability inside the energy storage system 1 may be started to drive the energy storage unit 101 and the battery control unit 103 that have no black start capability inside the energy storage system 1 to turn on, to further drive the DC/DC conversion unit 102 and the DC/AC conversion unit 201 to turn on. In this way, a recovery range of the energy storage system 1 is gradually expanded, and the energy storage system 1 is finally restarted. After the energy storage system 1 is restarted, the energy storage unit 101 may provide a direct current input voltage for the DC/DC conversion unit 102, and the DC/DC conversion unit 102 may perform power conversion on the direct current input voltage and may output direct current electrical energy to the DC/AC conversion unit 201. In this case, the DC/AC conversion unit 201 may perform power conversion on the direct current electrical energy that is input by the DC/DC conversion unit 102 and may output alternating current electrical energy to an alternating current grid or an alternating current load, to supply power to the alternating current grid or the alternating current load. Optionally, as shown in FIG. 9, the energy storage system 1 shown in FIG. 3 may further include an energy management system 40. When the energy storage system 1 is normally started, the energy management system 40 may deliver a power-on instruction to the DC/AC conversion unit 201, and the DC/AC conversion unit 201 may receive the power-on instruction from the energy management system 40 and turn on, convert direct current electrical energy that is output by the energy storage module 10 into alternating current electrical energy, to supply power to the alternating current grid or the alternating current load.

In the embodiments, when the power conversion module cannot receive the power-on instruction of the energy management system, the power conversion module may also actively turn on when detecting the target waveform signal on the direct current bus, to implement a black start of the energy storage system. This features lower costs and higher applicability.

The foregoing descriptions are merely implementations of the embodiments, but are not intended as limiting. Any variation or replacement readily figured out by a person skilled in the art within the scope described shall fall within the scope of the embodiments.

What is claimed is:

1. An energy storage system, comprising;
an energy storage module connected to a power conversion module through a direct current bus;
the energy storage module comprises an energy storage unit, a battery control unit, and a direct current/direct current (DC/DC) conversion unit, and the energy storage unit is connected in parallel to the DC/DC conversion unit; the energy storage unit is configured to provide a direct current input voltage for the DC/DC conversion unit; the battery control unit is configured to deliver a black start signal to the DC/DC conversion unit when detecting a black start instruction; the DC/DC conversion unit is configured to: receive the black start signal from the battery control unit and generate a target waveform signal on the direct current bus; and
the power conversion module is configured to: detect the target waveform signal on the direct current bus and turn on based on the target waveform signal.

2. The energy storage system according to claim 1, wherein the power conversion module comprises a direct current/alternating current (DC/AC) conversion unit, and
when the DC/AC conversion unit detects that a waveform of the target waveform signal is a preset waveform, the DC/AC conversion unit turns on and implements a black start of the storage system.

3. The energy storage system according to claim 2, wherein the DC/AC conversion unit actively turns on when the DC/AC conversion unit detects that a degree of matching between the waveform of the target waveform signal and the preset waveform is greater than or equal to a degree-of-matching threshold.

4. The energy storage system according to claim 2, wherein the DC/AC conversion unit ends operation when the DC/AC conversion unit detects that a degree of matching between the waveform of the target waveform signal and the preset waveform is less than a degree-of-matching threshold.

5. The energy storage system according to claim 1, wherein the energy storage module further comprises a black start unit, and the black start unit is connected to the energy storage unit;
the black start unit is configured to generate the black start instruction; and
the energy storage unit is configured to feed back the black start instruction to the battery control unit when detecting the black start instruction.

6. The energy storage system according to claim 1, wherein the energy storage unit includes one battery rack or a plurality of battery racks, and, when there are a plurality of battery racks, all of the plurality of battery racks are connected in parallel.

7. The energy storage system according to claim 1, wherein the DC/DC conversion unit is configured to perform open-loop control on a reference voltage of the direct current bus to generate the target waveform signal on the direct current bus.

8. The energy storage system according to claim 1, wherein the DC/DC conversion unit comprises a bus voltage loop; and
the DC/DC conversion unit is further configured to: collect a feedback voltage of the direct current bus and perform closed-loop control on the feedback voltage and a reference voltage of the direct current bus by using the bus voltage loop to generate the target waveform signal on the direct current bus.

9. The energy storage system according to claim 1, wherein a bus capacitor is included on the direct current bus, and the bus capacitor is connected in parallel to the DC/DC conversion unit.

10. The energy storage system according to claim 7, wherein a bus capacitor is included on the direct current bus, and the bus capacitor is connected in parallel to the DC/DC conversion unit.

11. The energy storage system according to claim 8, wherein a bus capacitor is included on the direct current bus, and the bus capacitor is connected in parallel to the DC/DC conversion unit.

12. The energy storage system according to claim 11, wherein the target waveform signal is a waveform signal of a voltage across the bus capacitor.

13. The energy storage system according to claim 1, wherein a bus inductor is included on the direct current bus, and the bus inductor is connected in series to the DC/DC conversion unit.

14. The energy storage system according to claim 7, wherein a bus inductor is included on the direct current bus, and the bus inductor is connected in series to the DC/DC conversion unit.

15. The energy storage system according to claim 8, wherein a bus inductor is included on the direct current bus, and the bus inductor is connected in series to the DC/DC conversion unit.

16. The energy storage system according to claim 15, wherein the target waveform signal is a waveform signal of a current flowing through the bus inductor.

17. The energy storage system according to claim 1, wherein the waveform of the target waveform signal includes: a square wave, a step wave, a sine wave, a sawtooth wave, a rectangular wave, a triangular wave, and/or a trapezoidal wave.

18. The energy storage system according to claim 2, wherein the energy storage system comprises an energy management system, and when the energy storage system starts, the energy management system delivers a power-on instruction to the DC/AC conversion unit, and the DC/AC conversion turns on.

19. The energy storage system according to claim 3, wherein the energy storage system comprises an energy management system, and when the energy storage system starts, the energy management system delivers a power-on instruction to the DC/AC conversion unit, and the DC/AC conversion turns on.

20. The energy storage system according to claim 2, wherein the power conversion module is the DC/AC conversion unit, and an output of the DC/AC conversion unit is configured to connect to an alternating current grid or an alternating current load; and the DC/AC conversion unit is further configured to: when the output is connected to the alternating current grid or the alternating current load, convert direct current electrical energy that is output by the energy storage module into alternating current electrical energy, to supply power to the alternating current grid or the alternating current load.

* * * * *